(12) United States Patent
Kim et al.

(10) Patent No.: US 11,073,717 B2
(45) Date of Patent: *Jul. 27, 2021

(54) DISPLAY DEVICE

(71) Applicant: SAMSUNG DISPLAY CO., LTD., Yongin-si (KR)

(72) Inventors: Il-Joo Kim, Hwaseong-si (KR); Kyung Ho Jung, Seongnam-si (KR); Se Young Song, Hwaseong-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/537,665

(22) Filed: Aug. 12, 2019

(65) Prior Publication Data

US 2019/0361289 A1 Nov. 28, 2019

Related U.S. Application Data

(62) Division of application No. 14/850,772, filed on Sep. 10, 2015, now Pat. No. 10,409,100.

(30) Foreign Application Priority Data

Feb. 17, 2015 (KR) .......................... 10-2015-0024470

(51) Int. Cl.
*G02F 1/1335* (2006.01)
*G02F 1/1333* (2006.01)

(52) U.S. Cl.
CPC ...... *G02F 1/133512* (2013.01); *G02F 1/1333* (2013.01); *G02F 1/13338* (2013.01); *G02F 1/133354* (2021.01); *G02F 1/133528* (2013.01)

(58) Field of Classification Search
CPC ............ G02F 1/133512; G02F 1/1333; G02F 1/13338; G02F 2001/133354
See application file for complete search history.

(56) References Cited

U.S. PATENT DOCUMENTS

| 6,717,646 B1 | 4/2004 | Park et al. |
| 8,134,779 B2 | 3/2012 | Roh et al. |
| 10,409,100 B2* | 9/2019 | Kim ................. G02F 1/133512 |
| 2002/0085163 A1* | 7/2002 | Park ...................... G02F 1/1333 349/158 |

(Continued)

FOREIGN PATENT DOCUMENTS

| KR | 1020000018745 | 4/2000 |
| KR | 1020100064525 | 6/2010 |
| KR | 1020130031492 | 3/2013 |

*Primary Examiner* — Jessica M Merlin
(74) *Attorney, Agent, or Firm* — F. Chau & Associates, LLC

(57) ABSTRACT

A display device includes: a display panel, a laminated member, a light blocking layer, and an alignment pattern. The display panel includes a display area. The laminated member is positioned on at least one surface of the display panel. The light blocking layer is positioned outside the display area and is disposed on one of the display panel or the laminated member. The alignment pattern is disposed on the other of the display panel and the laminated member correspondingly to an edge of the light blocking layer, and is configured to measure a misalignment between the display panel and the laminated member.

18 Claims, 11 Drawing Sheets

(56) References Cited

U.S. PATENT DOCUMENTS

2011/0051056 A1\* 3/2011 Li .................... G02F 1/1333
349/106
2014/0104512 A1 4/2014 Huang et al.
2016/0154246 A1 6/2016 Nakagawa \* cited by examiner

DISPLAY DEVICE

RELATED APPLICATIONS

This application is a divisional of U.S. application Ser. No. 14/850,772, filed on Sep. 10, 2015 in the U.S. Patent and Trademark Office, which in turn claims priority under 35 U.S.C. § 119 from Korean Patent Application No. 10-2015-0024470 filed in the Korean Intellectual Property Office on Feb. 17, 2015, and all the benefits accruing therefrom, the contents of both of which are herein incorporated by reference in their entirety.

BACKGROUND

1. Technical Field

Embodiments of the present disclosure are generally directed to a display device, and more particularly, to a display device capable of increasing accuracy of alignment between a display panel and a laminated member.

2. Discussion of the Related Art

A display device includes a display panel and a laminated member positioned on at least one surface of the display panel. The laminated member may be configured as a touch screen panel for receiving a touch, an optical film such as a polarization film, or a spatial light modulator for displaying a stereoscopic image.

A spatial light modulator may be a lens sheet, a barrier sheet, a liquid crystal lens panel, or a liquid crystal barrier panel, and refracts or partially blocks light emitted from the display panel. Accordingly, a user may perceive an image displayed by the display panel as a 3D image.

A display panel includes a black layer, also known as a black matrix layer, formed with a stripe pattern between pixels. The black layer can absorb external light and enhance contrast of the screen. The laminated member also includes an optical transmission axis in a predetermined direction or a stripe pattern part that can serve as an electrode, a wire, a lens, a barrier, etc.

When the display panel and the laminated member become misaligned during manufacture of the display device, screen brightness may be decreased or moire interference may be generated, in which a wave pattern is generated on the screen where the black layer and the stripe pattern part periodically overlap each other. As a result, display quality of the display device deteriorates.

SUMMARY

Embodiments of the present disclosure can provide a display device capable of measuring a misalignment angle between a display panel and a laminated member and correcting misalignment between the display panel and the laminated member with high accuracy.

An exemplary embodiment provides a display device, including: a display panel, a laminated member, a light blocking layer, and an alignment pattern. The display panel includes a display area. The laminated member is positioned on at least one surface of the display panel. The light blocking layer is positioned outside the display area on one of the display panel or the laminated member. The alignment pattern is disposed on the other of the display panel and the laminated member corresponding to an edge of the light blocking layer, and is configured to measure a misalignment angle between the display panel and the laminated member.

The alignment pattern may include a plurality of alignment marks arranged along the edge of the light blocking layer. Each of the plurality of alignment marks may include an overlapping portion that overlaps the light blocking layer and a non-overlapping portion that includes an opening and that corresponds to an outside of the light blocking layer.

When the display panel and the laminated member are misaligned, at least one opening of the plurality of alignment marks may overlap the light blocking layer, and a misalignment angle may be measured from the number of openings that overlap with the light blocking layer.

The laminated member may be positioned on or below the display panel. The light blocking layer may be disposed on the display panel, and the alignment pattern may be disposed on the laminated member. On the other hand, the light blocking layer may be disposed on the laminated member, and the alignment pattern may be disposed on the display panel.

On the other hand, the laminated member may include a first laminated member positioned below the display panel and a second laminated member positioned on the display panel. The light blocking layer may be disposed on the display panel, and the alignment pattern may include a first alignment pattern disposed on the first laminated member and a second alignment pattern disposed on the second laminated member.

The light blocking layer may include four edges. The first alignment pattern may correspond to a first pair of opposite edges of the light blocking layer, and the second alignment pattern may correspond to a second pair of opposite edges of the light blocking layer.

The alignment pattern may include rectangular alignment marks along the edge of the light blocking layer. The alignment mark may include an overlapping portion that overlaps the light blocking layer and a non-overlapping portion formed with a plurality of openings arranged along the edge of the light blocking layer that corresponds to the outside of the light blocking layer.

Each alignment mark may include identifying numbers engraved on the overlapping portion that identify each of the plurality of openings may be engraved on the overlapping portion. When the display panel and the laminated member are misaligned, at least one of the plurality of openings may overlap the light blocking layer, and a misalignment angle may be measured from the identifying number of the first opening that overlaps the light blocking layer.

On the other hand, the alignment pattern may include rectangular alignment marks along the edge of the light blocking layer, a single slit formed in the alignment mark parallel with the edge of the light blocking layer that exposes the edge of the light blocking layer, and an indication mark that indicates a reference position along the single slit.

When the display panel and the laminated member are misaligned, an entire width of the single slit may start overlapping the light blocking layer at a second position of the openings, and a misalignment of the laminated member may be measured by comparing the second position with the reference position.

On the other hand, the alignment pattern may include rectangular alignment marks along the edge of the light blocking layer, a plurality of openings formed in the light blocking layer that are arranged parallel to the edge, and an indication mark that indicates a reference position along the plurality of openings.

When the display panel and the laminated member are misaligned, at least one of the plurality of openings may be fully covered by the alignment mark, and a misalignment of the laminated member may be measured by comparing a position of the first opening to be covered by the alignment mark and the reference position.

The alignment pattern may further comprise identifying numbers engraved on the overlapping portion that identify each of the plurality of openings. When the display panel and the laminated member are misaligned, at least one of the plurality of openings may be covered by the alignment mark, and a misalignment angle may be measured from an identifying number of a first opening to be fully covered by the alignment mark.

The laminated member may be positioned on or below the display panel, and the alignment pattern may be positioned on the light blocking layer.

The laminated member may include at least one of a touch screen panel, a polarization film and a spatial light modulator displaying a stereoscopic image.

Another exemplary embodiment provides a display device, including: a display panel, a laminated member, a light blocking layer, a first alignment pattern, and a second alignment pattern. The display panel includes a display area. The laminated member includes a first laminated member positioned below the display panel and a second laminated member positioned on the display panel. The light blocking layer is disposed on the display panel outside the display area and includes two pairs of opposite edges. The first alignment pattern is disposed on the first laminated member, and the second alignment pattern is disposed on the second laminated member, wherein the first alignment pattern corresponds to a first pair of opposite edges of the light blocking layer, and the second alignment pattern corresponds to a second pair of opposite edges of the light blocking layer. The first and second alignment patterns are configured to measure a misalignment between the display panel and the laminated member.

The first alignment pattern may include a plurality of first alignment marks arranged along the first pairs of edges of the light blocking layer, and the second alignment pattern may include a plurality of second alignment marks arranged along the second pairs of edges of the light blocking layer. Each of the plurality of first and second alignment marks may include an overlapping portion that overlaps the light blocking layer and a non-overlapping portion that includes an opening and that corresponds to an outside of the light blocking layer. When the display panel and one of the first and second laminated members are misaligned, at least one opening of the plurality of first and second alignment marks overlaps the light blocking layer, and a misalignment angle may be measured from a number of openings that overlap the light blocking layer.

Another exemplary embodiment provides a display device, including: a display panel, a laminated member, a light blocking layer, and an alignment pattern. The display panel includes a display area. The laminated member is positioned on or below the display panel. The light blocking layer is positioned outside the display area and is disposed on one of the display panel or the laminated member, and the alignment pattern is disposed on the other of the display panel and the laminated member corresponding to an edge of the light blocking layer. The alignment pattern includes rectangular alignment marks along the edge of the light blocking layer, a plurality of openings formed in the light blocking layer that are arranged parallel to the edge, and an indication mark on the laminated member that indicates a reference position along the plurality of openings. The alignment pattern is configured to measure a misalignment between the display panel and the laminated member.

When the display panel and the laminated member are misaligned, at least one of the plurality of openings may be fully covered by the alignment mark, and a misalignment of the laminated member may be measured by comparing a position of a first opening to be covered by the alignment mark and the reference position.

The alignment pattern may further comprise identifying numbers engraved on the light blocking layer that identify each of the plurality of openings. When the display panel and the laminated member are misaligned, at least one of the plurality of openings may be covered by the alignment mark, and a misalignment angle may be measured from an identifying number of a first opening to be fully covered by the alignment mark.

According to an exemplary embodiment, misalignment of the laminated member with the display panel may be iteratively corrected by units of 0.01° or less using the light blocking layer and the alignment pattern. Therefore, it is possible to prevent deterioration of screen brightness or generation of moire interference patterns by precisely aligning the display panel and the laminated member.

DETAILED DESCRIPTION

Figure 1:
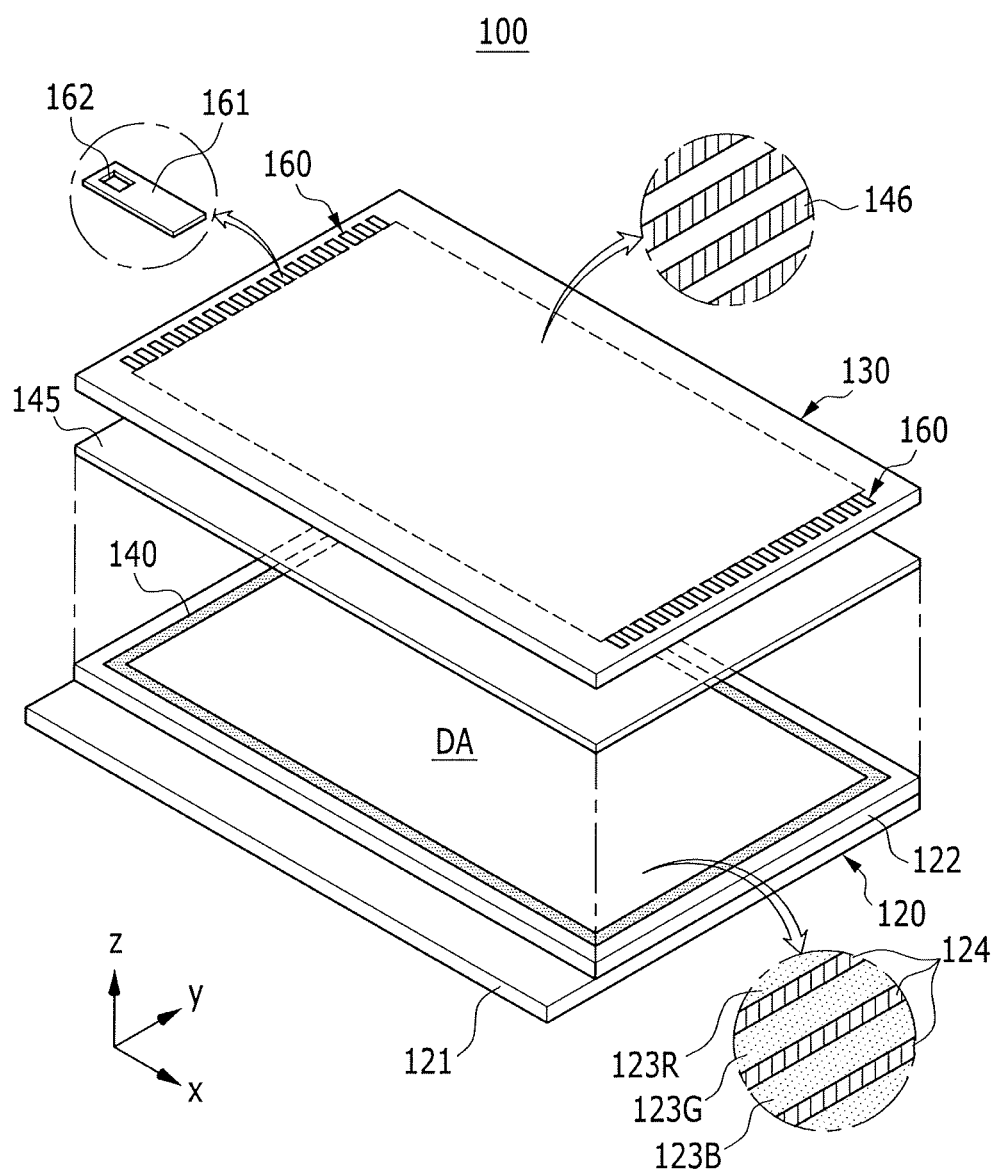
FIG. 1 is an exploded perspective view of a display device according to an exemplary embodiment.

Embodiments of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

It will be understood that when an element such as a layer, film, region, or substrate is referred to as being "on" another element, it can be directly on the other element or intervening elements may also be present.

In addition, the size and thickness of each configuration shown in the drawings may be exaggerated for understanding and ease of description, but embodiments are not limited thereto.

Figure 2:
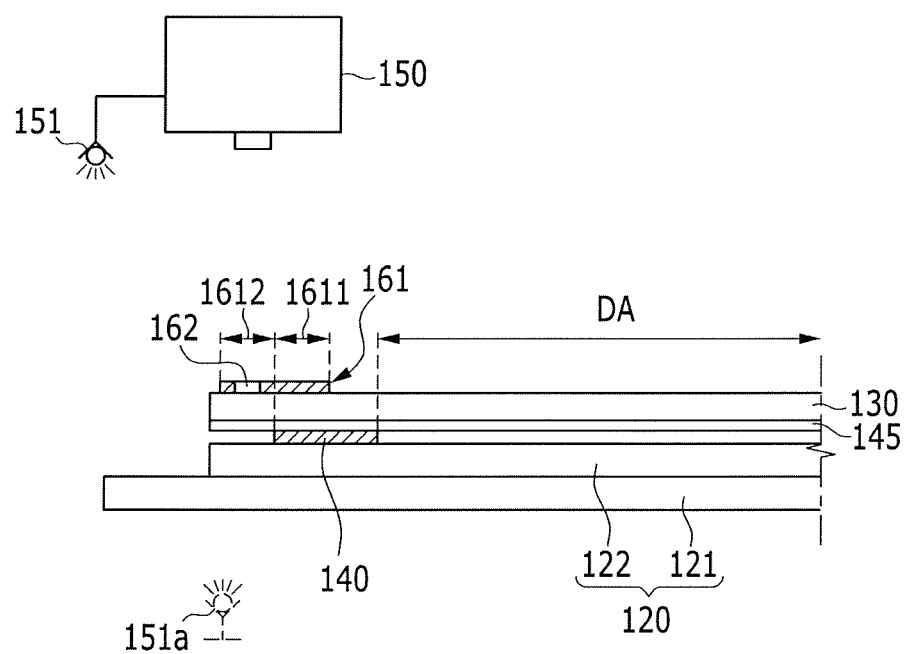
FIG. 2 is a partial cross-sectional view of the display device illustrated in FIG. 1.

FIG. 1 is an exploded perspective view of a display device according to an exemplary embodiment, and FIG. 2 is a partial cross-sectional view of the display device illustrated in FIG. 1.

Referring to FIGS. 1 and 2, a display device 100 of an exemplary embodiment includes a display panel 120, and a laminated member 130 on the display panel 120. The display panel 120 may be a known display panel such as a liquid crystal panel or an organic light emitting panel.

In the case of a liquid crystal panel, the display panel 120 includes a light source unit, a first substrate 121 on which a plurality of thin film transistors and a plurality of pixel electrodes are formed, and a second substrate 122 on which a common electrode and a color fitter are formed. A liquid crystal layer is injected between the first substrate 121 and the second substrate 122 and then sealed.

In the case of an organic light emitting panel, the display panel 120 includes a first substrate 121 on which a plurality of thin film transistors, a plurality of storage capacitors, and a plurality of organic light emitting diodes are formed, and a second substrate 122 that covers the first substrate 121. The second substrate 122 may be replaced with a thin film encapsulation layer that includes a plurality of organic layers and a plurality of inorganic layers.

The display panel 120 includes a display area DA for displaying an image and a light blocking layer 140 positioned around the display area DA. In the display area DA, a plurality of color pixels 123R, 123G, and 123B that correspond to color filters or organic emission layers are positioned, and black layers, such as black matrix layers, 124 are formed between the color pixels 123R, 123G, and 123B. The black layer 124 may have a stripe or lattice shape. The light blocking layer 140 may surround a periphery of the display area DA and be formed of the same light absorption material as the black layer 124.

The laminated member 130 may be attached to the display panel 120 by a transparent adhesive layer 145, and may include at least one of a touch screen panel for receiving a touch, a polarization film for reducing external light reflection, or a spatial light modulator for displaying a stereoscopic image. If the laminated member 130 is a spatial light modulator, a substrate for controlling a gap may be added between the display panel 120 and the laminated member 130.

A touch screen panel includes a plurality of sensing cells for receiving a touch and wires connected to the plurality of sensing cells. A polarization film may include at least one of a linear polarization film and a phase difference film. A spatial light modulator may be a lens sheet or a barrier sheet that implements a lens or a barrier by a physical method, or a liquid crystal lens panel or a liquid crystal barrier panel that implements a lens or a barrier by an electric method.

A lens sheet, which is a transparent sheet in which a plurality of lenses, such as lenticular lenses, are formed, refracts light emitted from the display area DA. A barrier sheet, which is a sheet in which a plurality of barriers is formed at regular intervals, limits propagation of light emitted from the display area DA. For example, the barrier can prevent light emitted from a left-eye pixel and light emitted from a right-eye pixel from being viewed by user's right eye and left eye, respectively.

A liquid crystal lens panel and a liquid crystal barrier panel, which include electrodes and the liquid crystal layer, electrically implement the lenses or barriers by realigning the liquid crystal molecules with an electric field. The liquid crystal lens panel and the liquid crystal barrier panel become transparent when an off voltage is applied to the panel, in which case an image in the display area DA is transmitted as is, and implement lenses or barriers when an on voltage is applied to the panel, in which case the image in the display area DA is converted into a 3D image.

If the spatial light modulator is a lens sheet or a barrier sheet, the display device 100 will not display a 2D image. On the contrary, if the spatial light modulator is a liquid crystal lens panel or a liquid crystal barrier panel, the display device 100 may selectively display a 2D image or a 3D image.

Since the polarization film includes an optical transmission axis in a predetermined direction, if the laminated member 130 is a polarization film, when misalignment occurs between the display panel 120 and the laminated member 130, brightness of the screen may deteriorate.

If the laminated member 130 is a touch screen panel or a spatial light modulator, the laminated member 130 includes a stripe pattern part 146 shown in an enlarged circle, that can serve as an electrode, a wire, a lens, or a barrier. In this case, when misalignment occurs between the display panel 120 and the laminated member 130, a wave pattern defect due to moire interference may be generated.

Figure 3:
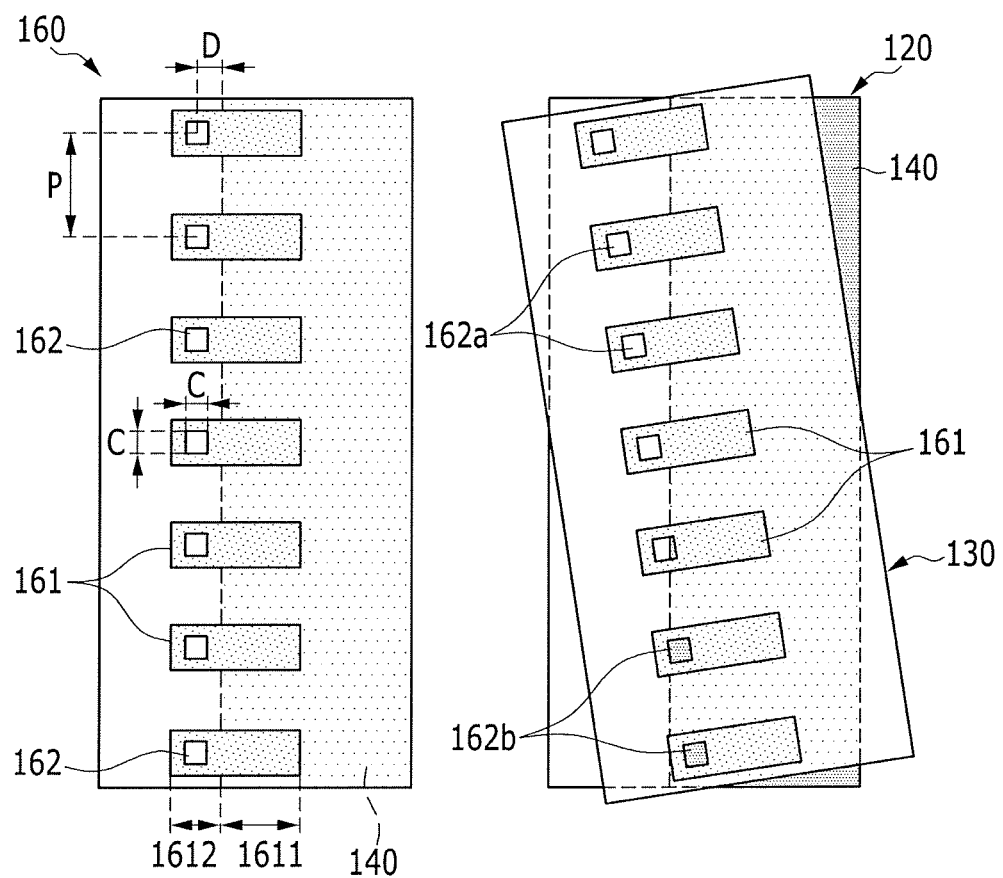
FIG. 3 is a partially enlarged view of the display device illustrated in FIG. 1.

The display device 100 of an exemplary embodiment includes an alignment pattern 160 for measuring a misalignment angle of the display panel 120 and the laminated member 130. The alignment pattern 160 is correspondingly disposed on one surface of the laminated member 130 at an edge of the light blocking layer 140. FIG. 3 is a partially enlarged view of the display device illustrated in FIG. 1.

Referring to FIGS. 1 to 3, the alignment pattern 160 includes a plurality of alignment marks 161 arranged in series at intervals therebetween along the edge of the light blocking layer 140.

Each alignment mark 161 includes an overlapping portion 1611 that overlaps the light blocking layer 140 and a non-overlapping portion 1612 positioned outside the light blocking layer 140, and an opening 162 is formed in the non-overlapping portion 1612. The alignment mark 161 may have a rectangular shape, and the opening 162 may have a square shape.

The alignment patterns 160 may be disposed at a left edge and a right edge of the light blocking layer 140. In this case, the plurality of alignment marks 161 are arranged in series in a short-axis direction, which is the y-axis direction of FIG. 1, of the laminated member 130. On the other hand, the alignment patterns 160 may be disposed at an upper edge and a lower edge of the light blocking layer 140. In this case, the plurality of alignment marks 161 are arranged in series in a long-axis direction, which is the x-axis direction of FIG. 1, of the laminated member 130.

In FIGS. 1 and 3, the alignment patterns 160 disposed at the left and right edges of the light blocking layer 140 are illustrated as a non-limiting example.

The plurality of alignment marks 161 are formed of an opaque material, and each of the plurality of openings 162 is disposed at a predetermined distance from the edge of the light blocking layer 140. When the display panel 120 and the laminated member 130 are precisely aligned, the plurality of openings 162 are positioned outside the light blocking layer 140. On the contrary, if the laminated member 130 is misaligned with the display panel 120, at least one of the openings 162 may overlap with the light blocking layer 140.

When the laminated member 130 is positioned above the display panel 120, the misalignment angle of the laminated member 130 may be measured by photographing the alignment patterns 160 by using a machine vision apparatus 150, shown in FIG. 2, that includes a CCD camera and counting the number of openings 162 that overlap with the light blocking layer 140. In addition, a position of the laminated member 130 may be corrected by aligning the laminated member 130 based on the measured misalignment angle.

When the laminated member 130 is misaligned with the display panel 120 at an angle, the plurality of openings 162 are divided into first openings 162a outside the light blocking layer 140 and second openings 162b that overlap the light blocking layer 140. The machine vision apparatus 150 includes an illumination light source 151, and light from the illumination light source 151 that passes through the first opening 162a also passes through the display panel 120, and light passing through the second opening 162b is absorbed in the light blocking layer 140.

For example, the machine vision apparatus 150 may count the number of first and second openings 162a and 162ba by assigning a value of 1 to the first opening 162a which is transparent and assigning a value of 0 to the second opening 162b which is black. In addition, the misalignment angle of the laminated member 130 may be measured based on the counting.

When the illumination light source 151 is included in the machine vision apparatus 150, since the measurement uses reflected light, the alignment mark 161 may be formed of an absorptive material which does not reflect light.

On the other hand, an illumination light source 151a may be positioned below the display panel 120. In this case, light emitted from the illumination light source 151a passes through the first opening 162a outside the light blocking layer 140 to be received by the machine vision apparatus 150. When the illumination light source 151a is positioned below the display panel 120, the alignment mark 161 may be formed of a reflective metal layer.

When the aforementioned alignment pattern 160 is used, the misalignment angle may be measured and corrected in increments of 0.01° or less. The following parameters may be specified according to a minute correction unit of, e.g., 0.01°, and the misalignment angle of the laminated member 130 may be digitized by the following parameters.

The parameters which can digitize the misalignment angle may include ① horizontal and vertical lengths C of the opening 162, ② distance D between the center of the opening 162 and the light blocking layer 140, ③ a distance (pitch) P between the centers of the openings 162, and ④ the total number N of openings 162 arranged in series.

As such, in the display device 100 of an exemplary embodiment, the alignment pattern 160 is formed on the laminated member 130, and as a result, the misalignment of the laminated member 130 with the display panel 120 may be minutely corrected by increments of 0.01° or less. Accordingly, by precisely aligning the display panel 120 and the laminated member 130, it is possible to prevent the brightness of the screen from deteriorating or a defect that generate a moire interference pattern on the screen.

Figure 4:
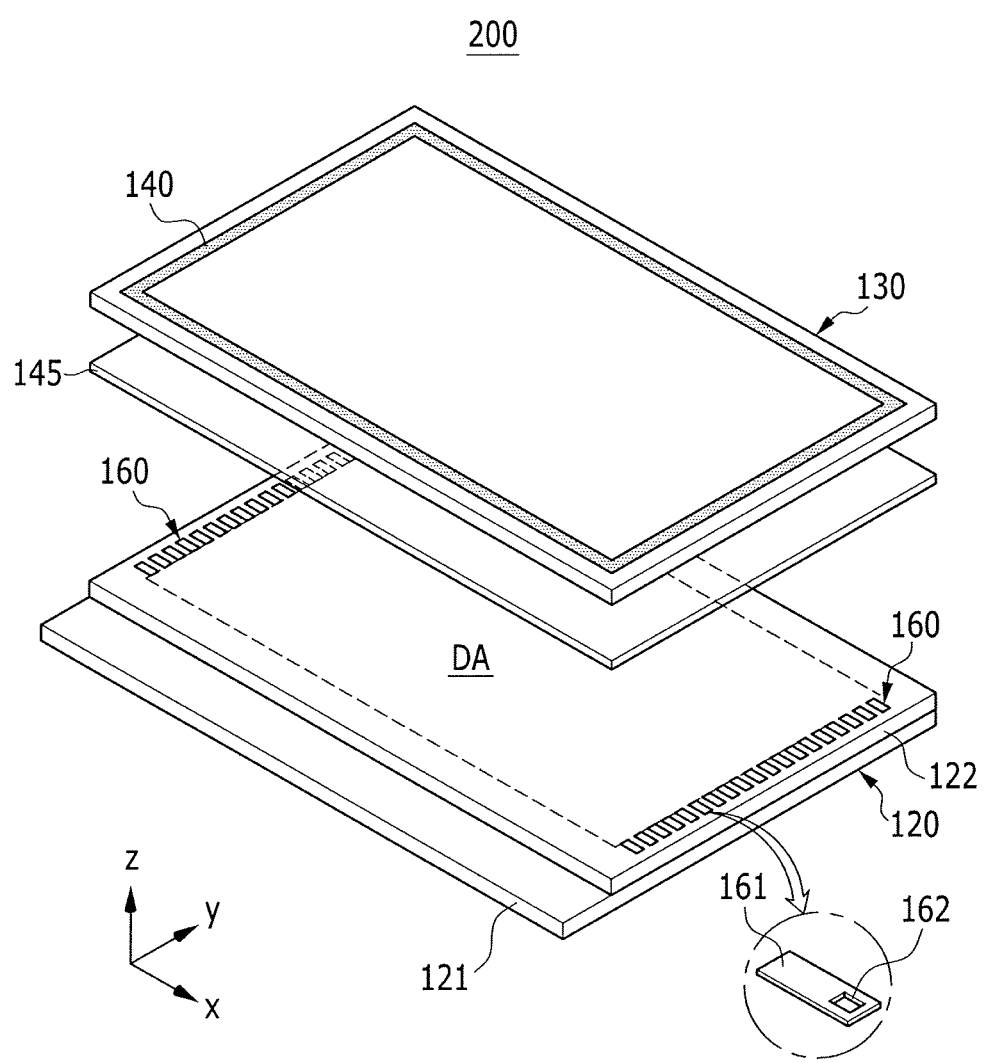
FIG. 4 is an exploded perspective view of a display device according to another embodiment.
Figure 5:
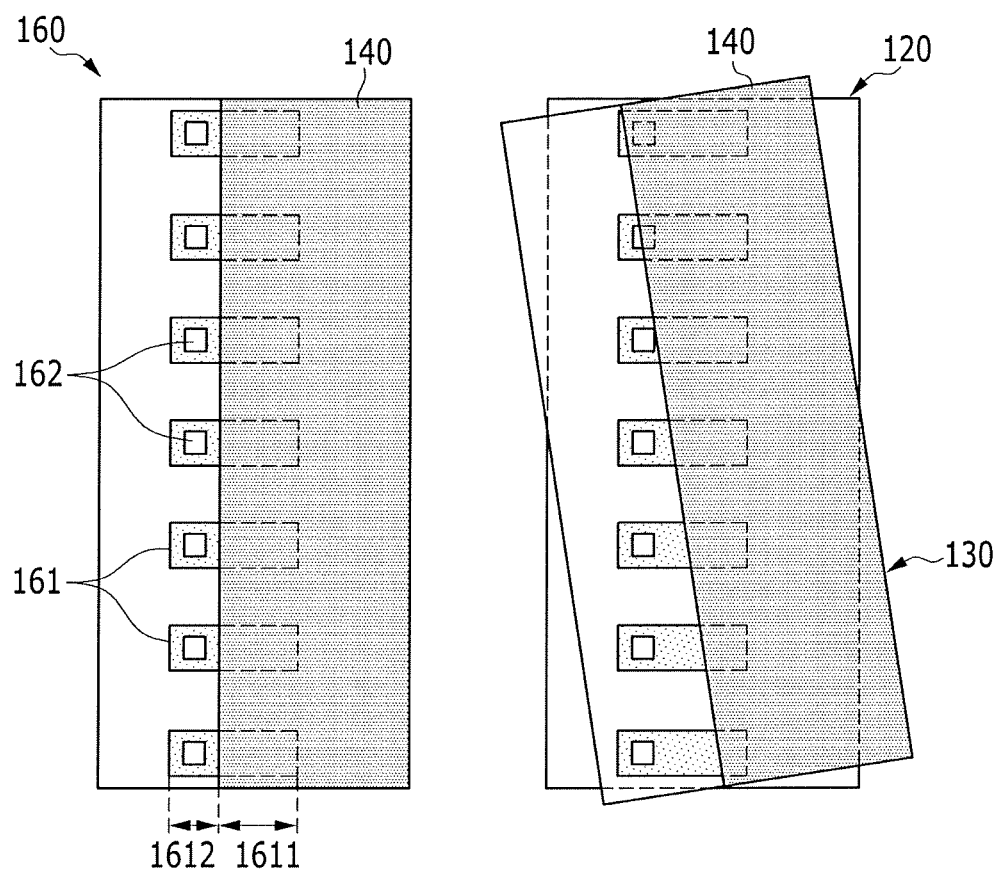
FIG. 5 is a partially enlarged view of the display device illustrated in FIG. 4.

FIG. 4 is an exploded perspective view of a display device according to another embodiment, and FIG. 5 is a partially enlarged view of the display device illustrated in FIG. 4.

Referring to FIGS. 4 and 5, in a display device 200 of another exemplary embodiment, a light blocking layer 140 is formed on the laminated member 130 and the alignment pattern 160 is formed on the display panel 120.

The alignment pattern 160 formed on the display panel 120 includes a plurality of alignment marks 161 separated by intervals therebetween along the edge of the light blocking layer 140. Each alignment mark 161 includes an overlapping portion 1611 that overlaps the light blocking layer 140 and a non-overlapping portion 1612 positioned outside the light blocking layer 140, and an opening 162 is formed in the non-overlapping portion 1612.

When the display panel 120 and the laminated member 130 are precisely aligned, the plurality of openings 162 are positioned outside the light blocking layer 140. On the contrary, when the laminated member 130 is misaligned with the display panel 120, at least one of the openings 162 may be covered by the light blocking layer 140. A machine vision apparatus can measure a misalignment angle of the laminated member 130 by counting the number of openings 162 not covered by the light blocking layer 140 and correct the misalignment angle of the laminated member 130 using a measured result.

The display device 200 of another exemplary embodiment has a same configuration as the exemplary embodiment of FIGS. 1-3 except for positions of the light blocking layer 140 and the alignment pattern 160.

Figure 6:
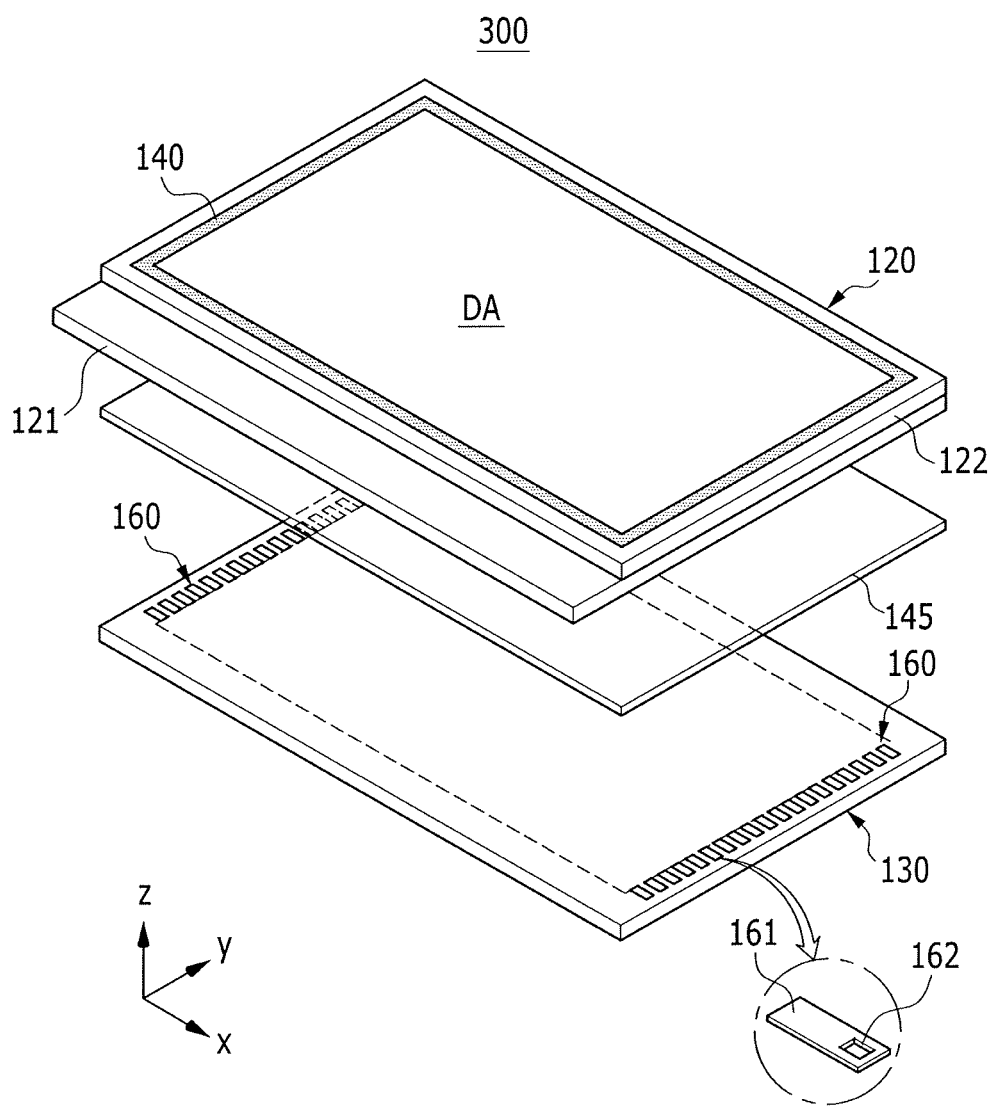
FIG. 6 is an exploded perspective view of a display device according to another exemplary embodiment.

FIG. 6 is an exploded perspective view of a display device according to another exemplary embodiment.

Referring to FIG. 6, in a display device 300 of another exemplary embodiment, the laminated member 130 is positioned below the display panel 120. The display panel 120 may be a liquid crystal panel, and a light source unit of the display panel 120 may be positioned below the laminated member 130. The laminated member 130 may be a polarization film or a spatial light modulator for displaying a stereoscopic image.

The light blocking layer 140 is formed on the display panel 120, and the alignment pattern 160 is formed on the laminated member 130. The display device 300 of another exemplary embodiment has a same configuration as the exemplary embodiment of FIGS. 1-3 except that the laminated member 130 is positioned below the display panel 120. In addition, the configuration where the light blocking layer 140 is positioned on the alignment pattern 160 and the method of measuring and correcting the misalignment angle depending on the configuration are the same as those of the aforementioned embodiment of FIGS. 4-5.

Figure 7:
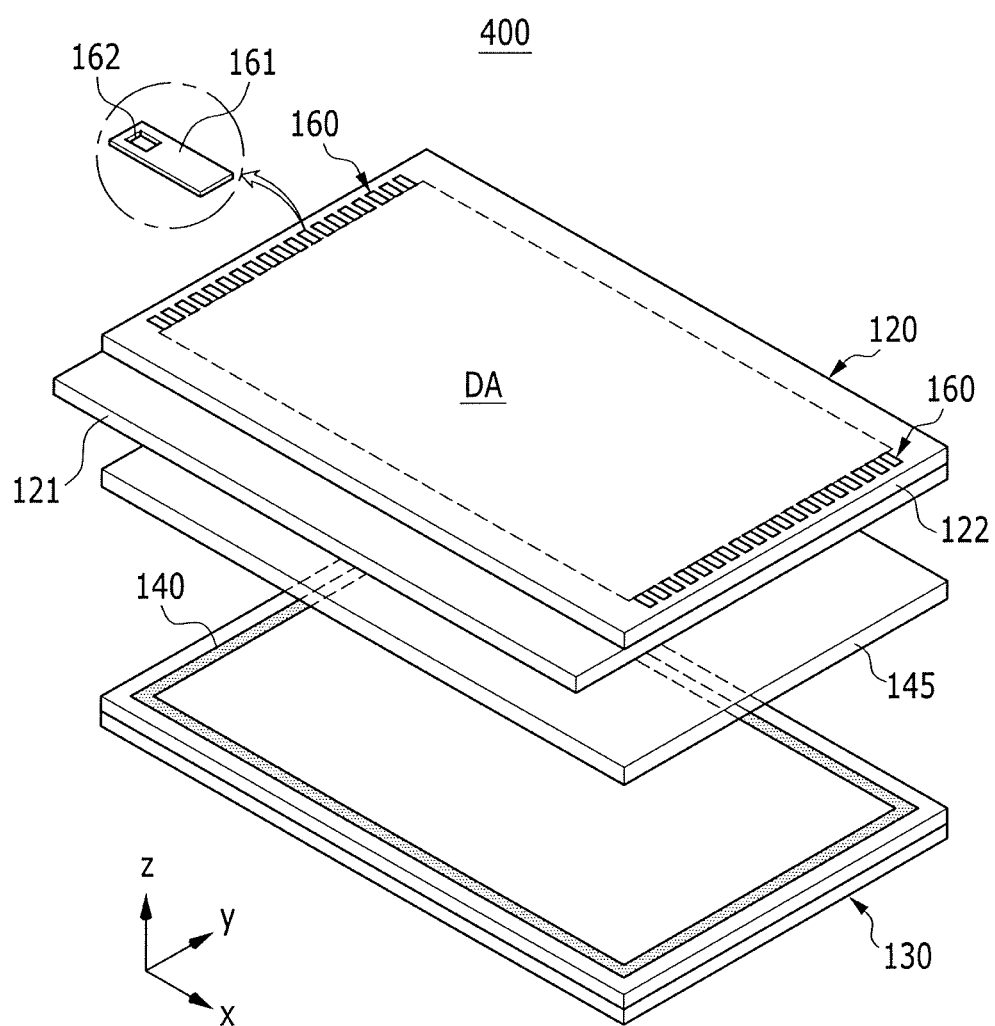
FIG. 7 is an exploded perspective view of a display device according to another exemplary embodiment.

FIG. 7 is an exploded perspective view of a display device according to another exemplary embodiment.

Referring to FIG. 7, in a display device 400 of another exemplary embodiment, the laminated member 130 is positioned below the display panel 120. The display panel 120 may be a liquid crystal panel, and a light source unit of the display panel 120 may be positioned below the laminated member 130. The laminated member 130 may be a polarization film or a spatial light modulator for displaying a stereoscopic image.

The light blocking layer 140 is formed on the laminated member 130, and the alignment pattern 160 is formed on the display panel 120. The display device 400 of another exemplary embodiment has a same configuration as the display device of the exemplary embodiment of FIGS. 4-5 except that the laminated member 130 is positioned below the display panel 120. In addition, the configuration where the alignment pattern 160 is positioned on the light blocking layer 140 and the method of measuring and correcting the misalignment angle depending on the configuration are same as those of the exemplary embodiment of FIGS. 1-3.

Figure 8:
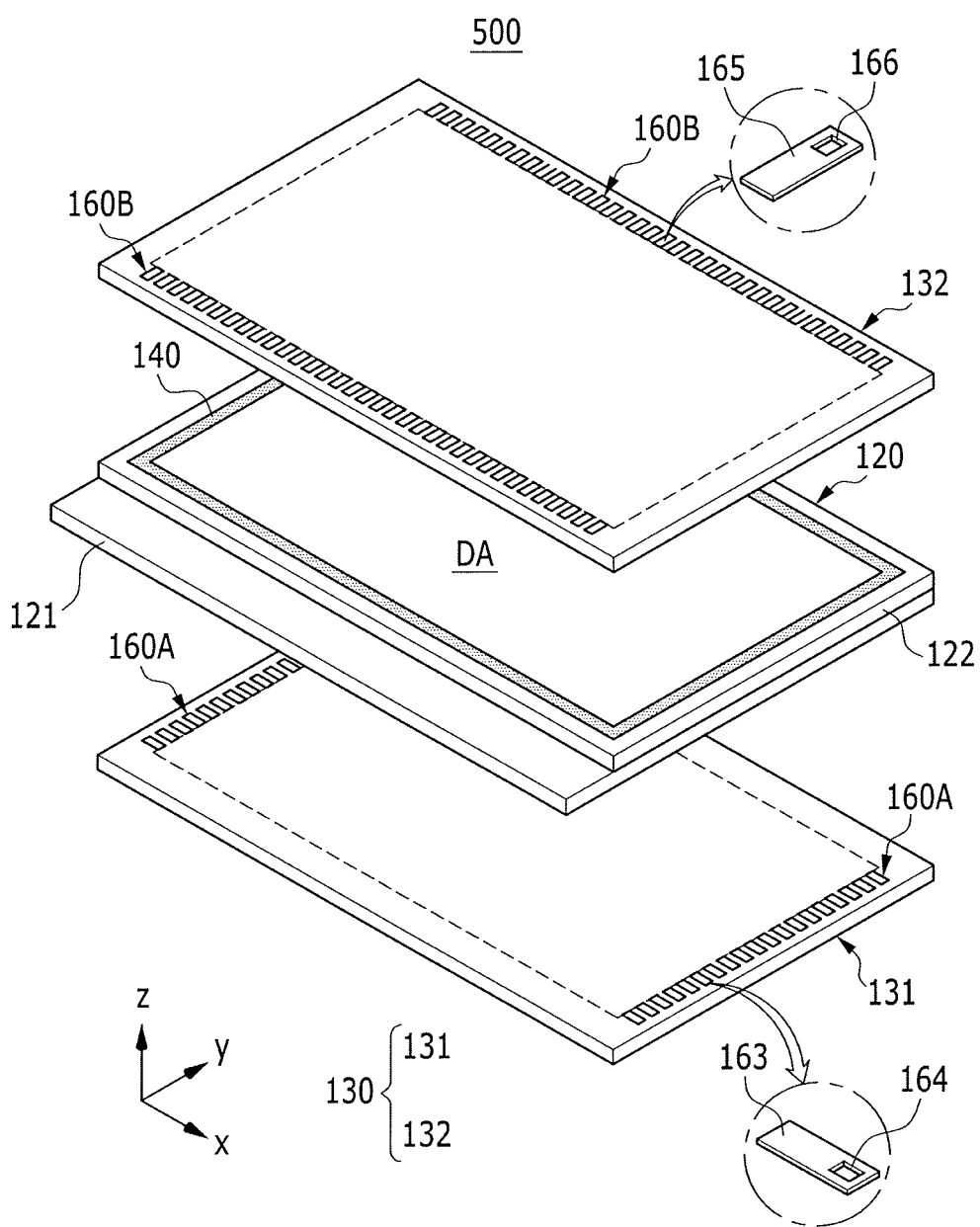
FIG. 8 is an exploded perspective view of a display device according to another exemplary embodiment.

FIG. 8 is an exploded perspective view of a display device according to another exemplary embodiment.

Referring to FIG. 8, in a display device 500 of another exemplary embodiment, the laminated member 130 includes a first laminated member 131 below the display panel 120 and a second laminated member 132 on the display panel 120. The display panel 120 may be a liquid crystal panel, and a light source unit of the display panel 120 may be positioned below the first laminated member 131.

The first laminated member 131 may be a polarization film or a spatial light modulator for displaying a stereoscopic image. The second laminated member 132 may be a polarization film, a touch screen panel, or a spatial light modulator for displaying a stereoscopic image. The light blocking layer 140 is formed on the display panel 120, and a first alignment pattern 160A and a second alignment pattern 160B are formed on the first laminated member 131 and the second laminated member 132, respectively.

The first alignment pattern 160A includes a plurality of first alignment marks 163 arranged in series with intervals therebetween along the edge of the light blocking layer 140. The second alignment pattern 160B includes a plurality of second alignment marks 165 arranged in series with intervals therebetween along the edge of the light blocking layer 140. The openings 164 and 166 are formed in the non-overlapping portion the first and second alignment marks 163 and 165, respectively, which does not overlap the light blocking layer 140.

The first alignment pattern 160A and the second alignment pattern 160B are formed to not overlap each other. For example, the first alignment patterns 160A may be disposed on a left edge and a right edge of the light blocking layer 140, and the second alignment patterns 160B may be disposed at an upper edge and a lower edge of the light blocking layer 140. The positions of the first alignment pattern 160A and the second alignment pattern 160B illustrated in FIG. 8 may vary from those shown.

A misalignment between the first laminated member 131 and the display panel 120 may be corrected using the first alignment pattern 160A and the light blocking layer 140, and a misalignment between the display panel 120 and the second laminated member 132 may be corrected using the light blocking layer 140 and the second alignment pattern 160B. The display device 500 of another exemplary embodiment has a same configuration as the aforementioned exemplary embodiment of FIG. 1-3 except that two laminated members 130 are provided.

Figure 9:
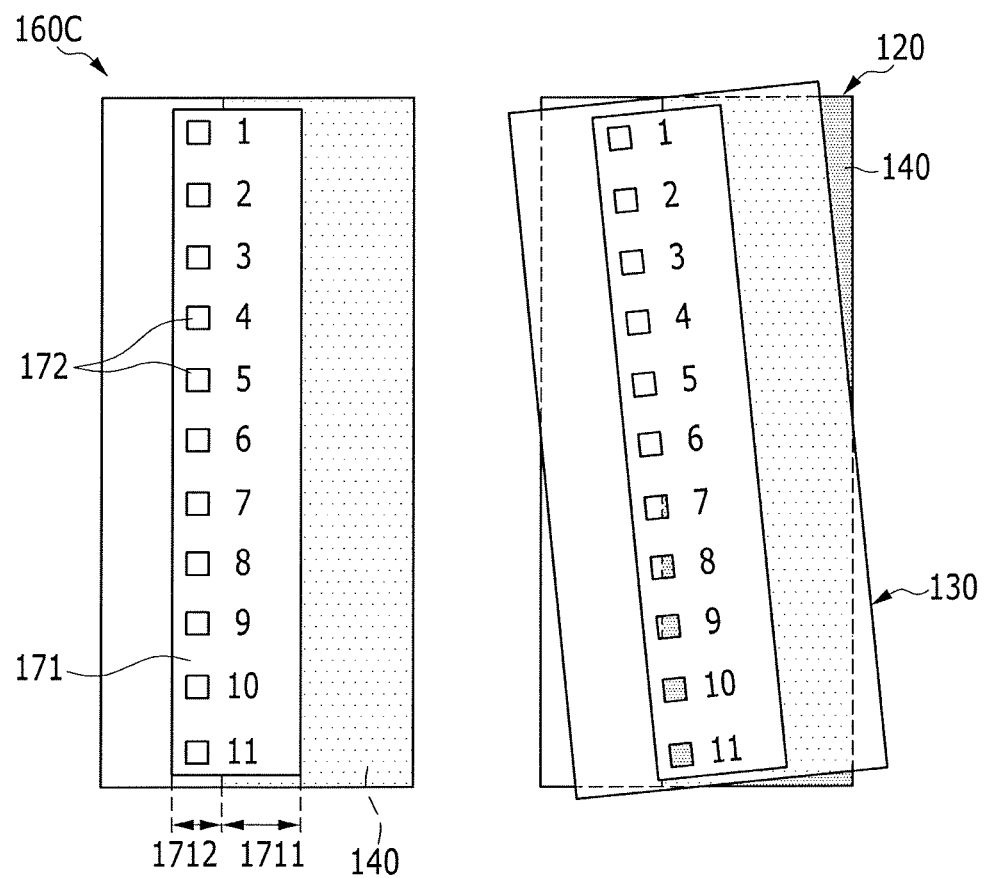
FIG. 9 is a partially enlarged view of an alignment pattern of a display device according to another exemplary embodiment.

FIG. 9 is a partially enlarged view of an alignment pattern of a display device according to another exemplary embodiment.

Referring to FIG. 9, in a display device of another exemplary embodiment, an alignment pattern 160C includes rectangular alignment marks 171 along the edge of the light blocking layer 140. Each alignment mark 171 includes an overlapping portion 1711 that overlaps the light blocking layer 140 and a non-overlapping portion 1712 positioned outside the light blocking layer 140, and a plurality of openings 172 formed in the non-overlapping portion 1712 with intervals therebetween in a length direction of the alignment mark 171.

Each of the plurality of openings 172 may have a square shape, and numbers identifying the openings 172, such as identifying numbers "1" to "11" shown in the figure, may be engraved on the overlapping portion 1711 of the alignment mark 171. If the laminated member 130 is misaligned with the display panel 120, at least one of the openings 172 overlaps with the light blocking layer 140.

If the laminated member 130 is positioned above the display panel 120, a misalignment angle of the laminated member 130 may be measured by photographing the alignment pattern 160C using a machine vision apparatus and identifying an identifying number of the opening 172 where the plurality of openings 172 starts to overlap the light blocking layer 140. In addition, a position of the laminated member 130 may be corrected by aligning the laminated member 130 based on the measured misalignment angle.

In a display device of another exemplary embodiment, except for the alignment pattern 160C, the remaining configurations are the same as those of the aforementioned exemplary embodiment of FIGS. 1-3.

Figure 10:
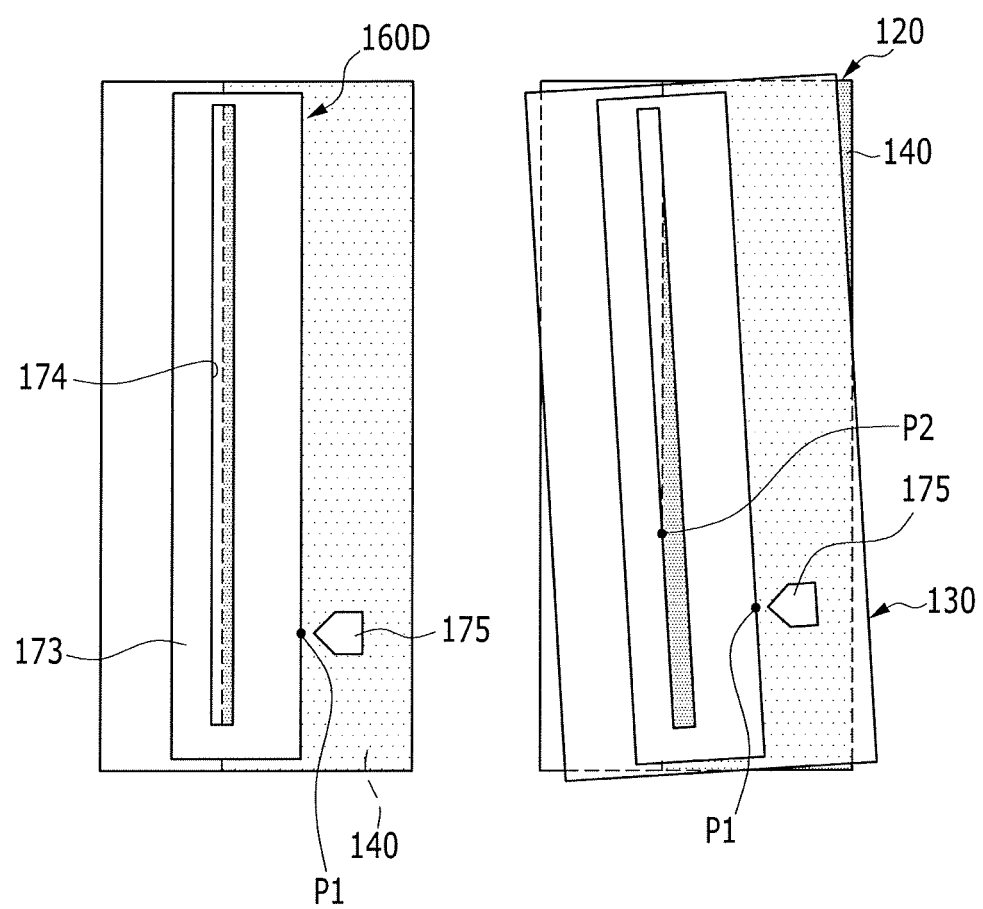
FIG. 10 is a partially enlarged view of an alignment pattern of a display device according to another exemplary embodiment.

FIG. 10 is a partially enlarged view of an alignment pattern of a display device according to another exemplary embodiment.

Referring to FIG. 10, in a display device of another exemplary embodiment, an alignment pattern 160D includes rectangular alignment marks 173 along the edge of the light blocking layer 140 and an indication mark 175 indicating a predetermined position of the alignment mark 173. A single slit 174 parallel with the edge of the light blocking layer 140 is formed in the alignment mark 173 to expose the edge of the light blocking layer 140.

When the display panel 120 and the laminated member 130 are precisely aligned, a vertical side of the opening 174 is parallel with the edge of the light blocking layer 140 and half of the opening 174 overlaps the light blocking layer 140. On the contrary, when the laminated member 130 is misaligned with the display panel 120, the long side of the opening 174 defines a misalignment angle with the edge of the light blocking layer 140, and the entire horizontal width of the opening 174 overlaps the light blocking layer 140 along portions of the opening 174.

The indication mark 175 indicates a reference position P1 which can be used to detect an alignment defect of the alignment mark 173. Let P2 denote a position where the entire horizontal width of the opening 174 starts to overlap the light blocking layer 140 due to the misalignment of the laminated member 130, then the position of the laminated member 130 may be corrected by comparing the reference position P1 indicated by the indication mark 175 with P2.

In detail, when the laminated member 130 is laminated on the display panel 120, the alignment pattern 160D can be photographed by the machine vision apparatus and the reference position P1 can be compared with the position P2 where the entire horizontal width of the opening 174 starts to overlap the light blocking layer 140. If P2 is higher than the reference position P1, it can be determined that there is an alignment defect, and the laminated member 130 is realigned, and the position of the laminated member 130 is iteratively corrected until P2 coincides with the reference position P1.

In a display device of another exemplary embodiment, except for the alignment pattern 160D, the remaining configurations are the same as those of the aforementioned exemplary embodiment of FIGS. 1-3.

Figure 11:
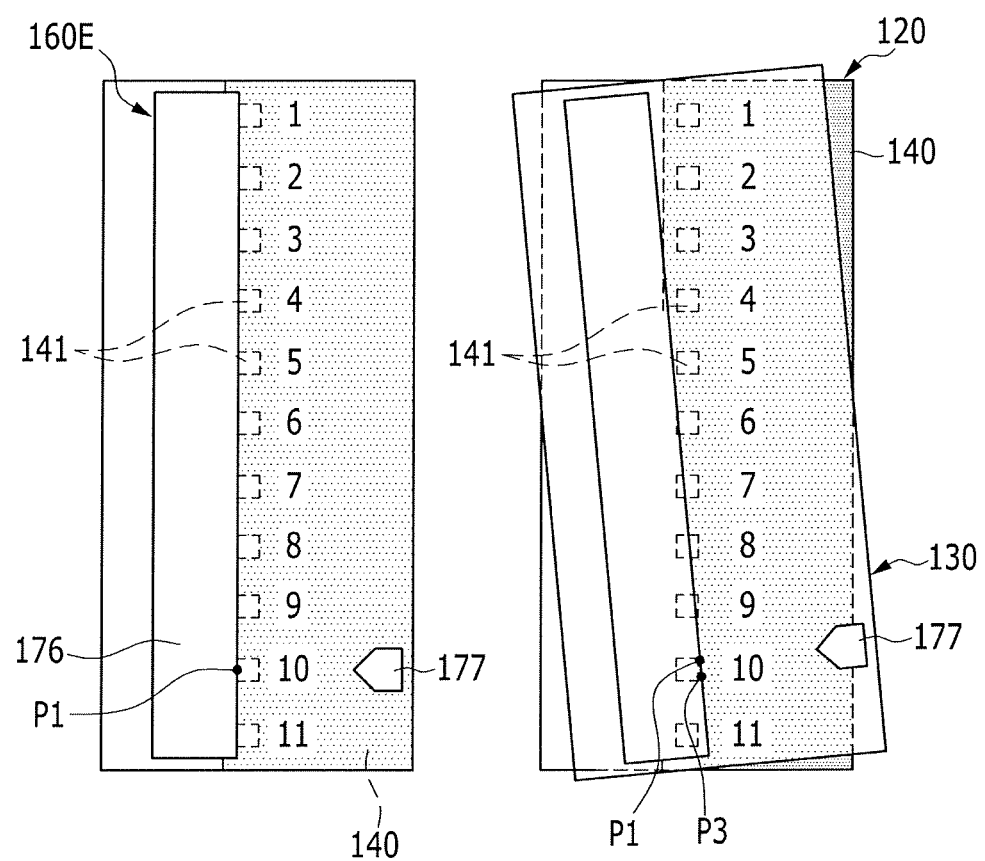
FIG. 11 is a partially enlarged view of an alignment pattern of a display device according to yet another exemplary embodiment.

FIG. 11 is a partially enlarged view of an alignment pattern of a display device according to another exemplary embodiment.

Referring to FIG. 11, in a display device of another exemplary embodiment, an alignment pattern 160E includes rectangular alignment marks 176 disposed on the laminated member 130 along the edge of the light blocking layer 140 and an indication mark 177 disposed on the laminated member 130 indicating a predetermined position of the alignment mark 176. In addition, a plurality of openings 141 arranged parallel to the edge of the light blocking layer 140 are formed in the light blocking layer 140.

A part of the alignment mark 176 overlaps the light blocking layer 140, and one side of the plurality of openings 141 may coincide with the edge of the alignment mark 176. Each of the plurality of openings 141 may have a square shape, and figures identifying the openings 140, such as identifying numbers "1" to "11" shown in the figure, may be engraved on the light blocking layer 140. The indication mark 177 indicates a reference position which can be used to detect an alignment defect of the alignment mark 176.

When the display panel 120 and the laminated member 130 are precisely aligned, none of the plurality of openings 141 overlap the alignment mark 176. On the contrary, when the laminated member 130 is misaligned with the display panel 120, some of the openings 141 are covered by the alignment mark 176, and openings 141 fully covered by the alignment mark 176 are generated.

When the laminated member 130 is positioned on the display panel 120, the alignment pattern 160E can be photographed by the machine vision apparatus and the reference position P1 indicated by the indication mark 177 can be compared with a position P3 where the openings 141 start to be covered by alignment mark 176. When P3 is higher than the reference position P1, it can be determined that there is an alignment defect, and the laminated member 130 is realigned, and the position of the laminated member 130 may be iteratively corrected until P3 coincides with the reference position P1.

On the other hand, a misalignment angle of the laminated member 130 may be measured by photographing the alignment pattern 160E using the machine vision apparatus and identifying an identifying number of the opening 141 which starts to be fully covered by the alignment mark 176. In addition, a position of the laminated member 130 may be corrected by aligning the laminated member 130 based on the measured misalignment angle.

In the display device of another exemplary embodiment, except for the alignment pattern 160E, the remaining configurations are the same as those of the aforementioned exemplary embodiment of FIGS. 1-3.

While embodiments of this disclosure has been described in connection with what is presently considered to be practical exemplary embodiments, it is to be understood that embodiments of the disclosure are not limited to the disclosed exemplary embodiments, but, on the contrary, are intended to cover various modifications and equivalent arrangements included within the spirit and scope of the appended claims.

What is claimed is:

1. A display device, comprising:
a display panel that includes a display area;
a laminated member positioned on at least one surface of the display panel;
a light blocking layer positioned outside the display area that is disposed on one of the display panel or the laminated member; and
an alignment pattern disposed on the other of the display panel and the laminated member corresponding to an edge of the light blocking layer, said alignment pattern being configured to measure a misalignment between the display panel and the laminated member,
wherein the laminated member includes a first laminated member positioned below the display panel and a second laminated member positioned on the display panel.

2. The display device of claim 1, wherein:
the alignment pattern includes a plurality of alignment marks arranged along the edge of the light blocking layer, and
each of the plurality of alignment marks includes an overlapping portion that overlaps the light blocking layer and a non-overlapping portion that includes an opening and that corresponds to an outside of the light blocking layer.

3. The display device of claim 2, wherein:
the display panel and the laminated member are configured to include at least one opening of the plurality of alignment marks that overlaps the light blocking layer in a state of misalignment, and
a misalignment angle is measured from a number of openings that overlap the light blocking layer.

4. The display device of claim 2, wherein:
the light blocking layer is disposed on the display panel, and
the alignment pattern includes a first alignment pattern disposed on the first laminated member and a second alignment pattern disposed on the second laminated member,
the light blocking layer includes four edges, and the first alignment pattern corresponds to a first pair of opposite edges of the light blocking layer, and
the second alignment pattern corresponds to a second pair of opposite edges of the light blocking layer.

5. The display device of claim 1, wherein:
the alignment pattern includes rectangular alignment marks along the edge of the light blocking layer, and
the alignment mark includes an overlapping portion that overlaps the light blocking layer and a non-overlapping portion formed with a plurality of openings arranged along the edge of the light blocking layer that corresponds to the outside of the light blocking layer.

6. The display device of claim 5, wherein:
each alignment mark includes identifying numbers engraved on the overlapping portion that identify each of the plurality of openings,
the display panel and the laminated member are configured to include at least one of the plurality of openings that overlaps the light blocking layer in a state of misalignment, and
a misalignment angle is measured from the identifying number of a first opening that overlaps the light blocking layer.

7. The display device of claim 1, wherein:
the alignment pattern includes rectangular alignment marks along the edge of the light blocking layer,
a single slit formed in the alignment mark parallel with the edge of the light blocking layer that exposes the edge of the light blocking layer, and
an indication mark that indicates a reference position along the single slit.

8. The display device of claim 7, wherein:
the display panel and the laminated member are configured to include an entire width of the single slit that starts overlapping the light blocking layer at a second position along the single slit in a state of misalignment, and
a misalignment defect of the laminated member is measured by comparing the second position with the reference position.

9. The display device of claim 1, wherein:
the alignment pattern includes rectangular alignment marks along the edge of the light blocking layer, a plurality of openings formed in the light blocking layer that are arranged parallel to the edge, and an indication mark that indicates a reference position along the plurality of openings.

10. The display device of claim 9, wherein:

the display panel and the laminated member are configured to include at least one of the plurality of openings that is fully covered by the alignment mark in a state of misalignment, and a misalignment of the laminated member is measured by comparing a position of a first opening to be covered by the alignment mark and the reference position.

11. The display device of claim 9, wherein:

the alignment pattern further comprises identifying numbers engraved on the overlapping portion that identify each of the plurality of openings, wherein the display panel and the laminated member are configured to include at least one of the plurality of openings that is covered by the alignment mark in a state of misalignment, and a misalignment angle is measured from an identifying number of a first opening to be fully covered by the alignment mark.

12. The display device of claim 9, wherein:

the laminated member is positioned on or below the display panel, and the alignment pattern is positioned on the light blocking layer.

13. The display device of claim 1, wherein:

the laminated member includes at least one of a touch screen panel, a polarization film, and a spatial light modulator for displaying a stereoscopic image.

14. A display device, comprising:

a display panel that includes a display area;

a laminated member that includes a first laminated member positioned below the display panel and a second laminated member positioned on the display panel;

a light blocking layer disposed on the display panel outside the display area that includes two pairs of opposite edges;

a first alignment pattern disposed on the first laminated member; and a second alignment pattern disposed on the second laminated member, wherein the first alignment pattern corresponds to a first pair of opposite edges of the light blocking layer, and the second alignment pattern corresponds to a second pair of opposite edges of the light blocking layer, said first and second alignment patterns being configured to measure a misalignment between the display panel and the laminated member.

15. The display device of claim 14, wherein:

the first alignment pattern includes a plurality of first alignment marks arranged along the first pairs of edges of the light blocking layer, the second alignment pattern includes a plurality of second alignment marks arranged along the second pairs of edges of the light blocking layer, each of the plurality of first and second alignment marks includes an overlapping portion that overlaps the light blocking layer and a non-overlapping portion that includes an opening and that corresponds to an outside of the light blocking layer, wherein the display panel and one of the first and second laminated members are configured to include at least one opening of the plurality of first and second alignment marks that overlaps the light blocking layer in a state of misalignment, and a misalignment angle is measured from a number of openings that overlap the light blocking layer.

16. A display device, comprising:

a display panel that includes a display area;

laminated members positioned on and below the display panel;

a light blocking layer positioned outside the display area that is disposed on one of the display panel or the laminated members; and an alignment pattern disposed on the other of the display panel and the laminated members corresponding to an edge of the light blocking layer, wherein the alignment pattern includes rectangular alignment marks along the edge of the light blocking layer, a plurality of openings formed in the light blocking layer that are arranged parallel to the edge, wherein each of the plurality of openings is surrounded by the light blocking layer, and an indication mark on the laminated members that indicates a reference position along the plurality of openings, wherein said alignment pattern is configured to measure a misalignment between the display panel and the laminated members.

17. The display device of claim 16, wherein:

the display panel and the laminated members are configured to include at least one of the plurality of openings that is fully covered by the alignment mark in a state of misalignment, and a misalignment of the laminated members is measured by comparing a position of a first opening to be covered by the alignment mark and the reference position.

18. The display device of claim 16, wherein:

the alignment pattern further comprises identifying numbers engraved on the light blocking layer that identify each of the plurality of openings, wherein the display panel and the laminated members are configured to include at least one of the plurality of openings that is covered by the alignment mark in a state of misalignment, and a misalignment angle is measured from an identifying number of a first opening to be fully covered by the alignment mark.

* * * * *